J. HOLLINGSWORTH.
HORSE HAY-RAKE.
No. 188,907. Patented March 27, 1877.
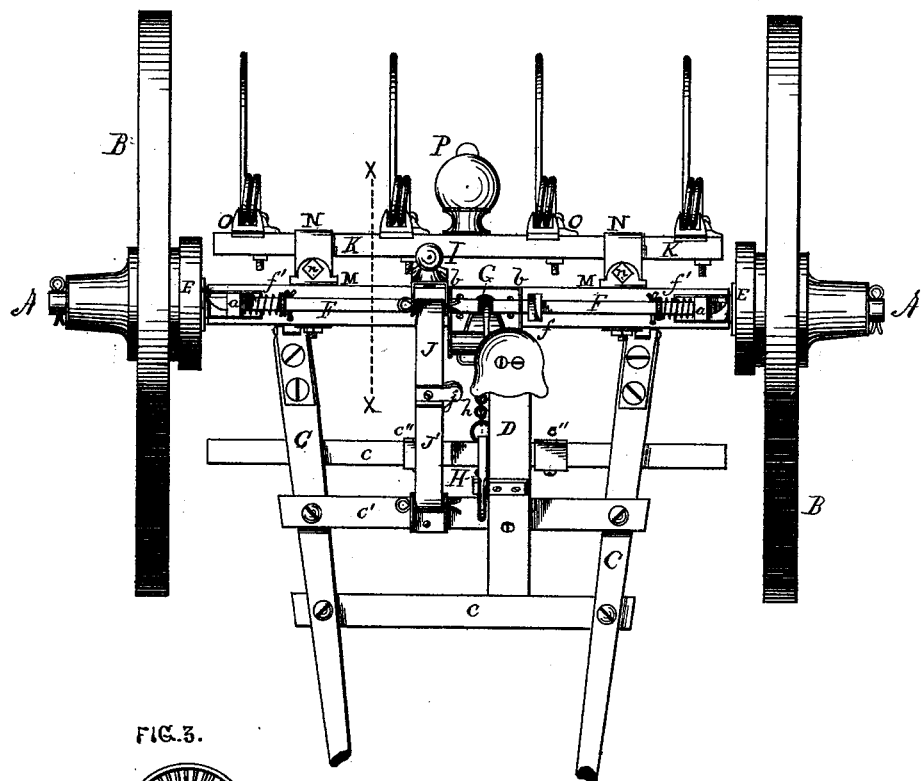
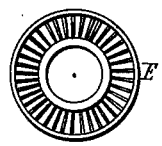
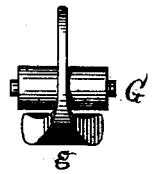
WITNESSES:
INVENTOR:
Jas Hollingsworth
PER
Munday & Evarts
his ATTORNEYS.

J. HOLLINGSWORTH.
HORSE HAY-RAKE.
No. 188,907. Patented March 27, 1877.
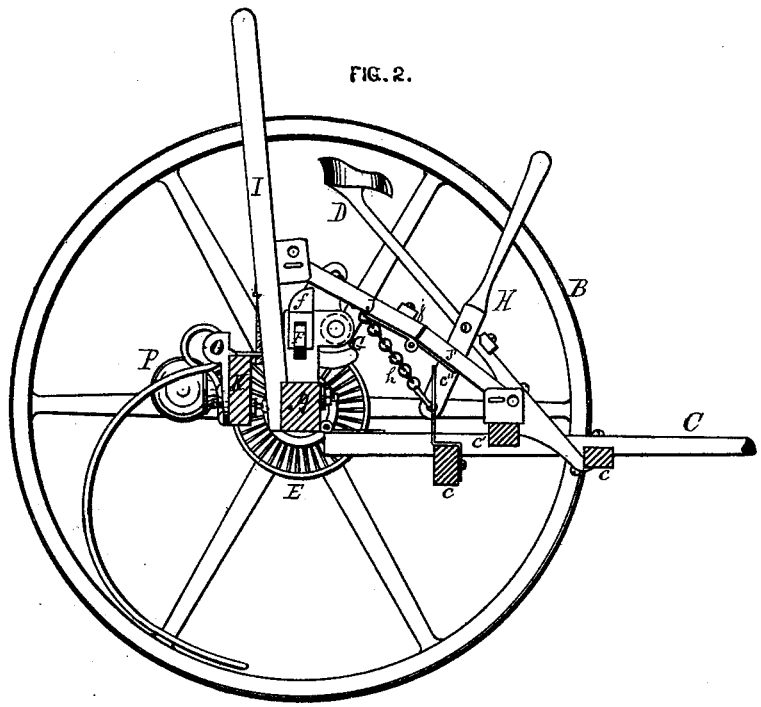
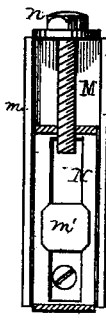
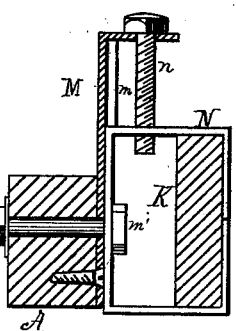
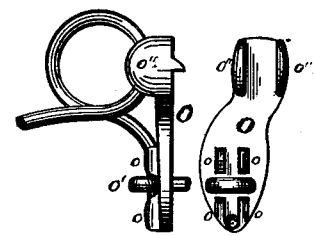
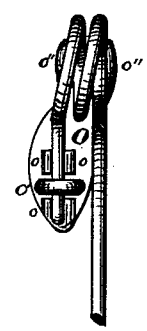
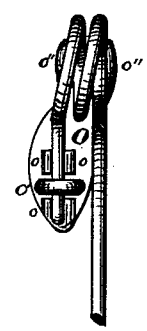
WITNESSES:
INVENTOR:

UNITED STATES PATENT OFFICE.

JAMES HOLLINGSWORTH, OF CHICAGO, ILLINOIS.

IMPROVEMENT IN HORSE HAY-RAKES.

Specification forming part of Letters Patent No. 188,907, dated March 27, 1877; application filed June 5, 1876.

*To all whom it may concern:*

Be it known that I, JAMES HOLLINGSWORTH, of Chicago, in the county of Cook and State of Illinois, have invented certain Improvements in Horse Hay-Rakes, of which the following is a specification:

To obtain the best work from horse-rakes it is essential that the teeth at the points should conform so nearly to the ground that they may pass under and raise the hay by sliding it up their inclined faces, because in that way they are made to carry rather than drag it over the ground, as they would do if the teeth projected straighter down. Another essential is that the teeth should be placed within the circle described by the peripheries of the carrying-wheels, because when any portion of their curvature falls outside of such circle a door of escape is opened at each side between the teeth and the wheels, through which much of the load will be lost. It is also a matter of moment that in the dumping operation the teeth be made to rise so high that they will be entirely freed from the accumulated products. To combine all these requisites in one machine has been the object of the present invention.

In the accompanying drawing, making a part of this specification, Figure 1 is a plan view of my improved horse-rake. Fig. 2 is a transverse vertical section of the same upon the line $x$ $x$ of Fig. 1. Fig. 3 is a view of the inside of the hub of the drive-wheels. Figs. 4 and 5 are detached views of the oscillating cam, hereinafter described. Figs. 6 and 7 show the method of attaching the head-bar to the axle, and of adjusting the same thereon. Figs. 8, 9, and 10 are views of my improved tooth-receiver, and the manner in which the tooth is secured therein.

Like letters indicate like parts in all the figures.

In said drawing, A represents the oscillating axle, and B B the carrying-wheels. C C are the thills, hinged at their rear ends by strap-hinges, or in other suitable manner, to the axle, and connected together by cross-bars $c$ $c$, placed under, and, by a single bar or platform, $c'$, placed on top of, them. D is the driver's seat, held by and between two of the cross-bars.

Attached to each hub of the carrying-wheels are circular rims E E, placed upon the inner side of said hubs, and provided or cast with ratchet faces, as more particularly shown in Fig. 3. F F are pawls, sliding in stationary bearings $a$ $a$ $b$ $b$, attached to the axle, the outer ends being beveled, as shown, so they may enter and engage with the ratchets E. These pawls are forced outward and into contact with the ratchets by means of an oscillating weighted cam, G, the form of which will be fully understood from Figs. 4 and 5, which are respectively side and front views thereof. This cam is trunnioned or pivoted in the bearings $b$ $b$ upon the axle, and is actuated by a lever, H, fulcrumed at the side of the driver's seat D, and a connecting-cord, $h$.

The construction and arrangement of the cam are such that it will, after it has performed its function of forcing out the pawls, automatically swing back on its trunnions to its original position, by reason of the gravitating force exerted by the wide portion $g$.

The pawls are each provided upon their inner ends with arms $f f$, which, when the axle is swung clear over in discharging the load, strike the inclined faces of the stationary cams $c''$, projecting upward from one of the cross-bars $c$, and are thereby forced inward and out of contact with the wheels. Springs $f'$ $f'$, one at each of the outer ends of the pawls, are placed there to prevent the accidental slipping out of the latter.

With the exception of the cam G, the parts thus far described by letters do not differ materially from the same parts as described in the Letters Patent to me dated September 7, 1875, and numbered 167,533.

Extending upward from the axle is another lever, I, between which and the cross-bar $c'$, and adjustably hinged to each thereof, is a toggle, J J', which holds the teeth down to their work, the driver assisting, if necessary, by placing his foot upon the projecting foot-piece $j$, attached to the part J. The construction of these parts and their operation will also be found fully set forth and shown in said Letters Patent.

Attached to the rear of the axle by adjustable attachments, more particularly described below, is the tooth-bar K, by the use of which I am enabled to accomplish the desirable results hereinbefore stated, namely, to place the teeth where they will do the most perfect work, to keep them within the peripheral line of the wheels, to swing them high in discharging the load, and to adjust to different kinds of land and different kinds of work.

The adjustable attachments consist of the L-shaped metal strips M, attached in an inverted position to the axle, the edges of the upright portion being turned over so as to form flanges m, between which the metal band N, inclosing the tooth-bar, as shown in Fig. 7, may slide. That portion of the band which slides in the strip M is slotted, as shown in Fig. 6, through which slot passes a bolt, $m'$, which also passes through the body of the axle, and holds the parts rigidly in the desired position. The bar is, of course, readily adjusted as to height, by loosening the bolts $m'$, when it can be placed at any height which the slots in the bands N will permit, by means of the vertical screw n, as is apparent from said Figs. 6 and 7.

The teeth are held in and attached to the bar by means of receivers O, fully illustrated in detail in Figs. 8, 9, and 10. These receivers are cast in a single piece, are provided with ears o o at the lower face, between which the tooth-wire is firmly bedded, and are slotted for the entrance of the bolt $o'$, by which both they and the teeth are rigidly secured to the bar K. They are also furnished with ears $o''$ $o''$ at the upper corners, whereby a perfect lateral support for the tooth and scroll is afforded—much more desirable and durable than the common method of supporting them by gains in the wood.

P is a counterbalancing-weight, attached to the tooth-bar, and designed by its gravity to compel the return of the teeth to the ground, thus rendering that part of the operation automatic. In the same manner an artificial counterbalancing-weight may be advantageously applied to the machine in such manner as to assist in raising the load preparatory to dumping.

The importance of employing these counterbalancing-weights will be seen when it is understood that in those horse-rakes in which the axle is stationary all the weight of the teeth rocker-frame or rake-head in rear of the axle must be lifted by the operator after the dropping of every gathered load. In those where the axle oscillates, the shafts, platform, and the driver's weight overbalance all in rear of the axle, and the driver is obliged to lift no inconsiderable amount upon the lever to get the teeth back. The same is true in the case of those rakes whose axles neither oscillate nor remain stationary, but revolve.

By the application of a weight (which may be adjustable or stationary, and be placed either forward or in rear of the weight to be counterbalanced,) however, to aid the driver in operating the rake, the labor upon his part is rendered very slight indeed, and the operation may be made almost or quite automatic.

The cam G can be used with but one face, where one wheel is employed to furnish power to unload the rake, and still possess the same advantages as are present in the one shown.

The operation of my improved rake is substantially as follows: When a sufficient load has been gathered, the driver, pulling upon the lever H, actuates the cam G, and thereby forces the pawls to engage with the ratchets upon the wheels. These in their rotation then carry or turn over the axle, and with it the head-bar and teeth, and the accumulated grass, until the arms upon the pawls come in contact with the cams $c''$, by which the pawls are forced back out of the ratchets, and the turning movement of the axle and its dependent parts ceases, the discharge of the load having taken place in the meanwhile, and as soon as the teeth were raised high enough to permit it. The axle, teeth, &c., are then returned to their original positions by the gravitating force of the weight, the cam G returning and adjusting itself by its own gravity.

What I claim as new is—

1. In a horse hay-rake which is dumped by the rotation of the wheel or wheels, the combination, with the pawl or pawls which move to engage the wheel or wheels in the line of the axle, of a vertically-oscillating cam, which will return of its own weight upon its pivot after action, being thus perfectly self-adjusting, substantially as set forth.

2. In combination with the scroll-tooth, the metallic tooth-holder, constructed to receive the main wire of the tooth, and provided with lateral support for the scroll, whereby a firm and durable fastening is insured, substantially as specified.

3. In a horse-rake, and in combination with the axle-tree thereof, the independent and vertically-adjustable rake-head or tooth-bar, attached to the rear of said axle-tree, and carrying the rake-teeth, substantially as specified.

JAMES HOLLINGSWORTH.

Witnesses:
EDW. S. EVARTS,
JOHN W. MUNDAY.